(12) United States Patent
Kawakami (10) Patent No.: US 11,661,345 B2
(45) Date of Patent: May 30, 2023

(54) FIBROUS CARBON NANOSTRUCTURE, METHOD OF PRODUCING FIBROUS CARBON NANOSTRUCTURE, AND METHOD OF PRODUCING SURFACE-MODIFIED FIBROUS CARBON NANOSTRUCTURE

(71) Applicant: ZEON CORPORATION, Tokyo (JP)

(72) Inventor: Osamu Kawakami, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 110 days.

(21) Appl. No.: 17/593,213

(22) PCT Filed: Mar. 10, 2020

(86) PCT No.: PCT/JP2020/010365
§ 371 (c)(1),
(2) Date: Sep. 13, 2021

(87) PCT Pub. No.: WO2020/195800
PCT Pub. Date: Oct. 1, 2020

(65) Prior Publication Data
US 2022/0169513 A1   Jun. 2, 2022

(30) Foreign Application Priority Data
Mar. 27, 2019   (JP) .............................. JP2019-061144

(51) Int. Cl.
 *C01B 32/174*   (2017.01)
(52) U.S. Cl.
 CPC ........ *C01B 32/174* (2017.08); *C01B 2202/02* (2013.01)

(58) Field of Classification Search
CPC . C01B 32/174; C01B 2202/02; C01B 32/168; C01B 32/158; C01B 32/159; C01B 32/16; C01B 32/162; C01B 32/164; C01B 32/166; C01B 32/17; C01B 32/172; C01B 32/176; C01B 32/178; C01B 2202/00; C01B 2202/04; C01B 2202/06;
(Continued)

(56) References Cited

U.S. PATENT DOCUMENTS
2016/0229695 A1   8/2016   Yoshiwara

FOREIGN PATENT DOCUMENTS
CN   101250059 A   8/2008
WO   2015045418 A1   4/2015

OTHER PUBLICATIONS

Sep. 28, 2021, International Preliminary Report on Patentability issued in the International Patent Application No. PCT/JP2020/010365. (Year: 2021).*

(Continued)

*Primary Examiner* — Daniel C. McCracken
(74) *Attorney, Agent, or Firm* — Kenja IP Law PC (57) ABSTRACT

Provided is a fibrous carbon nanostructure that is easy to surface modify. A peak of a temperature derivative curve that is a first derivative curve of a thermogravimetric curve obtained by thermogravimetric analysis of the fibrous carbon nanostructure in a dry air atmosphere has a full width at half maximum of not less than 38° C. and less than 90° C., and a high-temperature-side temperature at a height equivalent to $1/10$ of the peak top height of the peak is 658° C. or higher.

7 Claims, 1 Drawing Sheet

(58) Field of Classification Search
CPC ............ C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 40/00; B82Y 30/00; C01P 2002/88; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

OTHER PUBLICATIONS

Sep. 28, 2021, International Preliminary Report on Patentability issued in the International Patent Application No. PCT/JP2020/010365.
Zhishuang Dai et al., Effect of heat treatment on carbon fiber surface properties and fibers/epoxy interfacial adhesion, Applied Surface Science, 2011, pp. 8457-8461, vol. 257.

* cited by examiner

FIBROUS CARBON NANOSTRUCTURE, METHOD OF PRODUCING FIBROUS CARBON NANOSTRUCTURE, AND METHOD OF PRODUCING SURFACE-MODIFIED FIBROUS CARBON NANOSTRUCTURE

TECHNICAL FIELD

The present disclosure relates to a fibrous carbon nanostructure, a method of producing a fibrous carbon nanostructure, and a method of producing a surface-modified fibrous carbon nanostructure.

BACKGROUND

Fibrous carbon nanostructures such as carbon nanotubes (hereinafter, also referred to as "CNTs") have been attracting interest in recent years as materials having excellent electrical conductivity, thermal conductivity, and mechanical characteristics.

However, it has been difficult to cause fibrous carbon nanostructures such as CNTs to display the high-level characteristics expected thereof because such fibrous carbon nanostructures readily form bundle structures through Van der Waals forces and the like, and are difficult to disperse in solvents and resins.

In response, a technique has been proposed for increasing dispersibility of fibrous carbon nanostructures such as CNTs by subjecting the fibrous carbon nanostructures to surface modification treatment such as oxidation treatment (for example, refer to Patent Literature (PTL) 1).

CITATION LIST

Patent Literature

PTL 1: WO2015/045418A1

SUMMARY

Technical Problem

From a viewpoint of obtaining surface-modified fibrous carbon nanostructures having excellent dispersibility through surface modification treatment of fibrous carbon nanostructures, it is necessary for the fibrous carbon nanostructures serving as a source material to be well surface modified.

However, there is room for improvement of conventional fibrous carbon nanostructures in terms of further improving the ease of surface modification treatment.

Accordingly, one object of the present disclosure is to provide a fibrous carbon nanostructure that is easy to surface modify and a method of producing this fibrous carbon nanostructure.

Another object of the present disclosure is to provide a surface-modified fibrous carbon nanostructure that has been well surface modified.

Solution to Problem

The inventor conducted diligent studies with the aim of achieving the objects described above. The inventor discovered that a fibrous carbon nanostructure having specific properties is easy to surface modify, and, in this manner, completed the present disclosure.

Specifically, the present disclosure aims to advantageously solve the problem set forth above, and a presently disclosed fibrous carbon nanostructure is a fibrous carbon nanostructure for which a peak of a temperature derivative curve that is a first derivative curve of a thermogravimetric curve obtained by thermogravimetric analysis in a dry air atmosphere (hereinafter, a "temperature derivative curve that is a first derivative curve of a thermogravimetric curve" is referred to simply as a "temperature derivative curve") has a full width at half maximum of not less than 38° C. and less than 90° C., and a high-temperature-side temperature at a height equivalent to 1/10 of peak top height of the peak is 658° C. or higher. A fibrous carbon nanostructure for which the peak of a temperature derivative curve has a full width at half maximum of not less than 38° C. and less than 90° C. and the high-temperature-side temperature at a height equivalent to 1/10 of peak top height of the peak is 658° C. or higher is easy to surface modify when subjected to surface modification treatment such as oxidation treatment.

Figure 1:
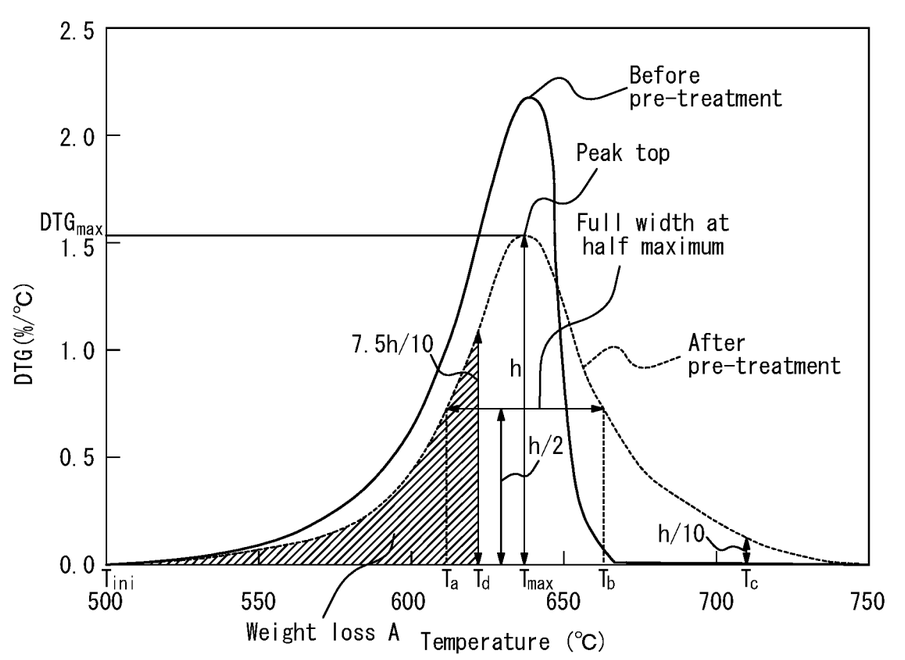
FIG. 1 is a graph schematically illustrating the shape of a peak of a temperature derivative curve.

The "peak" referred to in the present disclosure is, in a diagram of the temperature derivative curve (for example, FIG. 1), a convex curve section that, among convex curve sections including a point where the absolute value of the weight change per 1° C. is a local maximum, is a convex curve section including a point where the absolute value of the weight change per 1° C. is the global maximum (for example, $DTG_{max}$ in FIG. 1), and is a curve section between a low-temperature-side temperature (for example, $T_{ini}$ in FIG. 1) and a high-temperature-side temperature at a point where the absolute value of the weight change per 1° C. is a local minimum (global minimum in a case in which one apex (local maximum) is present and a local minimum is not present as in FIG. 1). However, note that the point at which the absolute value of the weight change per 1° C. is a local minimum (global minimum in a case in which one apex (local maximum) is present and a local minimum is not present as in FIG. 1) is at a height equivalent to 1/10 or less of peak top height of the peak. Moreover, the "full width at half maximum" of the "peak" and the "high-temperature-side temperature at a height equivalent to 1/10 of peak top height of the peak" can be determined using methods described in the EXAMPLES section of the present specification.

The presently disclosed fibrous carbon nanostructure preferably has a weight loss of 40 weight % or less at a low-temperature-side temperature at a height equivalent to 7.5/10 of peak top height of the peak. A fibrous carbon nanostructure having a weight loss of 40 weight % or less at a low-temperature-side temperature at a height equivalent to 7.5/10 of peak top height of the peak is easier to surface modify when subjected to surface modification treatment such as oxidation treatment.

The "weight loss" at the "low-temperature-side temperature at a height equivalent to 7.5/10 of peak top height of the peak" referred to in the present disclosure can be determined using a method described in the EXAMPLES section of the present specification.

It is preferable for the presently disclosed fibrous carbon nanostructure that the peak has a peak top temperature of not lower than 530° C. and lower than 730° C. A fibrous carbon nanostructure for which the peak top temperature of the peak is lower than 530° C. is easily burned off when subjected to surface modification treatment such as oxidation treatment, whereas a fibrous carbon nanostructure for which the peak top temperature of the peak is 730° C. or higher is harder to surface modify when subjected to surface modification treatment such as oxidation treatment.

The "peak top temperature" of the "peak" referred to in the present disclosure can be determined using a method described in the EXAMPLES section of the present specification.

Moreover, the present disclosure aims to advantageously solve the problem set forth above, and a presently disclosed method of producing a fibrous carbon nanostructure produces any one of the fibrous carbon nanostructures set forth above and comprises heating a fibrous carbon nanostructure to a temperature of 120° C. or higher in a vacuum atmosphere.

Furthermore, the present disclosure aims to advantageously solve the problem set forth above, and a presently disclosed method of producing a fibrous carbon nanostructure produces any one of the fibrous carbon nanostructures set forth above and comprises heating a fibrous carbon nanostructure to a temperature of 800° C. or higher in an inert gas atmosphere.

Also, a presently disclosed method of producing a surface-modified fibrous carbon nanostructure comprises performing surface modification treatment of any one of the fibrous carbon nanostructures set forth above to obtain a surface-modified fibrous carbon nanostructure. The surface modification treatment may be wet oxidation treatment.

Advantageous Effect

According to the present disclosure, it is possible to provide a fibrous carbon nanostructure that is easy to surface modify and a method of producing this fibrous carbon nanostructure.

Moreover, according to the present disclosure, it is possible to provide a method of producing a surface-modified fibrous carbon nanostructure that has been well surface modified.

BRIEF DESCRIPTION OF THE DRAWING

In the accompanying drawing.

DETAILED DESCRIPTION

The following provides a detailed description of embodiments of the present disclosure.

One or more presently disclosed fibrous carbon nanostructures are easy to surface modify when subjected to surface modification treatment such as oxidation treatment, for example. Moreover, surface-modified fibrous carbon nanostructures obtained through surface modification treatment of the presently disclosed fibrous carbon nanostructures can, without any specific limitations, suitably be used in production of a dispersion liquid having the surface-modified fibrous carbon nanostructures dispersed in a dispersion medium, for example.

Fibrous Carbon Nanostructures

It is a requirement for the presently disclosed fibrous carbon nanostructures that a peak of a temperature derivative curve obtained by thermogravimetric analysis in a dry air atmosphere has a full width at half maximum of not less than 38° C. and less than 90° C., and that a high-temperature-side temperature at a height equivalent to ¹/₁₀ of peak top height of the peak is 658° C. or higher. As a result of the peak of the temperature derivative curve having a full width at half maximum of not less than 38° C. and less than 90° C. and the high-temperature-side temperature at a height equivalent to ¹/₁₀ of peak top height of the peak being 658° C. or higher, the presently disclosed fibrous carbon nanostructures are well surface modified when subjected to surface modification treatment such as oxidation treatment.

The fibrous carbon nanostructures may, without any specific limitations, be circular tube shaped carbon nanostructures such as carbon nanotubes (CNTs) or non-circular tube shaped carbon nanostructures such as carbon nanostructures resulting from a six-membered ring network of carbon being formed in a flattened tube shape, for example.

Note that the presently disclosed fibrous carbon nanostructures may include one of the types of carbon nanostructures described above or may include two or more of the types of carbon nanostructures described above.

Of the types of carbon nanostructures described above, fibrous carbon nanostructures including CNTs are preferable as the fibrous carbon nanostructures. This is because fibrous carbon nanostructures including CNTs can display particularly good characteristics (for example, electrical conductivity, thermal conductivity, strength, etc.) when dispersibility thereof is increased through surface modification treatment.

Note that the fibrous carbon nanostructures including CNTs may be composed of just CNTs or may be a mixture of CNTs and fibrous carbon nanostructures other than CNTs.

Although single-walled carbon nanotubes and/or multi-walled carbon nanotubes can be used as CNTs included among the fibrous carbon nanostructures without any specific limitations, carbon nanotubes having from one to five walls are preferable, and single-walled carbon nanotubes are more preferable. This is because carbon nanotubes having fewer walls can display particularly good characteristics when dispersibility thereof is increased through surface modification treatment.

A peak of a temperature derivative curve obtained by thermogravimetric analysis of the presently disclosed fibrous carbon nanostructures in a dry air atmosphere is required to have a full width at half maximum of not less than 38° C. and less than 90° C. The full width at half maximum of the peak of the temperature derivative curve for the fibrous carbon nanostructures is preferably 40° C. or more, and more preferably 49° C. or more. Moreover, the full width at half maximum of the peak of the temperature derivative curve for the fibrous carbon nanostructures is preferably 85° C. or less, and more preferably 80° C. or less. Impurities that promote air oxidation can be removed when the full width at half maximum of the peak of the temperature derivative curve is not less than the lower limit of any of the preferable ranges, whereas the occurrence of burning off during surface modification of the fibrous carbon nanostructures can be inhibited when the full width at half maximum of the peak of the temperature derivative curve is not more than the upper limit of any of the preferable ranges.

In addition, the high-temperature-side temperature at a height equivalent to ¹/₁₀ of peak top height of a peak of a temperature derivative curve obtained by thermogravimetric analysis of the presently disclosed fibrous carbon nanostructures in a dry air atmosphere is required to be 658° C. or higher. The high-temperature-side temperature at a height equivalent to ¹/₁₀ of peak top height of the peak of the temperature derivative curve for the fibrous carbon nanostructures is preferably 660° C. or higher, more preferably 665° C. or higher, even more preferably 673° C. or higher, and further preferably 689° C. or higher, and is normally 760° C. or lower. When the high-temperature-side temperature at a height equivalent to 1/10 of peak top height of the peak of the temperature derivative curve is not lower than the lower limit of any of the preferable ranges, the fibrous carbon nanostructures can be even better surface modified when subjected to surface modification treatment such as oxidation treatment.

The weight loss at a low-temperature-side temperature at a height equivalent to 7.5/10 of peak top height of a peak of a temperature derivative curve obtained by thermogravimetric analysis of the presently disclosed fibrous carbon nanostructures in a dry air atmosphere is preferably 40 weight % or less, more preferably 38 weight % or less, even more preferably 35 weight % or less, further preferably 31 weight % or less, and even further preferably 29 weight % or less, and is normally 10 weight % or more. When the weight loss at a low-temperature-side temperature at a height equivalent to 7.5/10 of peak top height of the peak of the temperature derivative curve is not more than any of the upper limits set forth above, the fibrous carbon nanostructures can be even better surface treated when subjected to surface modification treatment such as oxidation treatment.

The peak top temperature of a peak of a temperature derivative curve obtained by thermogravimetric analysis of the presently disclosed fibrous carbon nanostructures in a dry air atmosphere is preferably 530° C. or higher, more preferably 550° C. or higher, and even more preferably 570° C. or higher, and is preferably lower than 730° C., more preferably 710° C. or lower, and even more preferably 690° C. or lower. When the peak top temperature of the peak of the temperature derivative curve is not lower than 530° C. and lower than 730° C., the fibrous carbon nanostructures can be even better surface treated when subjected to surface modification treatment such as oxidation treatment.

Note that the thermogravimetric curve is a thermogravimetric curve having mass on a vertical axis and temperature on a horizontal axis, and the first derivative curve of the thermogravimetric curve is a temperature derivative curve having a derivative thermogravimetric (DTG) value on a vertical axis and temperature on a horizontal axis.

Also note that (i) the full width at half maximum (° C.), (ii) the high-temperature-side temperature ("b Value" in Table 1) (° C.) at a height equivalent to 1/10 of peak top height, (iii) the weight loss (weight %) at a low-temperature-side temperature at a height equivalent to 7.5/10 of peak top height of the peak, and (iv) the peak top temperature (° C.) for the peak of the temperature derivative curve for the fibrous carbon nanostructures can be adjusted by altering pre-treatment conditions of the fibrous carbon nanostructures (for example, the atmosphere in pre-treatment (vacuum atmosphere or inert gas atmosphere), the treatment temperature, etc.).

The average diameter of the fibrous carbon nanostructures is preferably 1 nm or more, and is preferably 60 nm or less, more preferably 30 nm or less, and even more preferably 10 nm or less. Fibrous carbon nanostructures having an average diameter within any of the ranges set forth above can display particularly good characteristics when dispersibility thereof is increased through surface modification treatment.

The "average diameter of the fibrous carbon nanostructures" referred to in the present disclosure can be determined by measuring the diameters (external diameters) of 20 randomly selected fibrous carbon nanostructures, for example, in a transmission electron microscope (TEM) image, and then calculating a number-average value of the measured diameters.

The fibrous carbon nanostructures are preferably fibrous carbon nanostructures for which a ratio ($3\sigma/Av$) of a value $3\sigma$ (value obtained by multiplying the diameter standard deviation ($\sigma$: sample standard deviation) by 3) relative to the average diameter (Av) is more than 0.20 and less than 0.80, more preferably fibrous carbon nanostructures for which $3\sigma/Av$ is more than 0.25, and even more preferably fibrous carbon nanostructures for which $3\sigma/Av$ is more than 0.50. Fibrous carbon nanostructures for which $3\sigma/Av$ is more than 0.20 and less than 0.80 can display particularly good characteristics when dispersibility thereof is increased through surface modification treatment.

The average diameter (Av) and the standard deviation ($\sigma$) of the fibrous carbon nanostructures may be adjusted by changing the production method and the production conditions of the fibrous carbon nanostructures, or may be adjusted by combining a plurality of types of fibrous carbon nanostructures obtained by different production methods.

The average length of the fibrous carbon nanostructures is preferably 10 μm or more, more preferably 50 μm or more, and even more preferably 80 μm or more, and is preferably 600 μm or less, more preferably 550 μm or less, and even more preferably 500 μm or less. Fibrous carbon nanostructures having an average length within any of the ranges set forth above can display particularly good characteristics when dispersibility thereof is increased through surface modification treatment.

Note that the "average length of the fibrous carbon nanostructures" referred to in the present disclosure can be determined by measuring the lengths of 20 fibrous carbon nanostructures, for example, in a scanning electron microscope (SEM) image, and then calculating a number-average value of the measured lengths.

The fibrous carbon nanostructures normally have an aspect ratio of more than 10. Note that the aspect ratio of the fibrous carbon nanostructures can be determined by measuring the diameters and lengths of 20 randomly selected fibrous carbon nanostructures using a scanning electron microscope or a transmission electron microscope, and then calculating an average value of the ratio of diameter and length (length/diameter).

The BET specific surface area of the fibrous carbon nanostructures is preferably 600 $m^2/g$ or more, and more preferably 800 $m^2/g$ or more, and is preferably 2,000 $m^2/g$ or less, more preferably 1,800 $m^2/g$ or less, and even more preferably 1,600 $m^2/g$ or less. When the BET specific surface area of the fibrous carbon nanostructures is 600 $m^2/g$ or more, the fibrous carbon nanostructures can display particularly good characteristics when dispersibility thereof is increased through surface modification treatment. Moreover, when the BET specific surface area of the fibrous carbon nanostructures is 2,000 $m^2/g$ or less, the dispersibility thereof can be sufficiently increased when surface modification treatment is performed.

Herein, the term "BET specific surface area" refers to nitrogen adsorption specific surface area measured by the BET method.

It is preferable that the fibrous carbon nanostructures have not been subjected to opening formation treatment and that a t-plot for the fibrous carbon nanostructures obtained from an adsorption isotherm exhibits a convex upward shape. Fibrous carbon nanostructures for which a t-plot exhibits a convex upward shape can display particularly good characteristics when dispersibility thereof is increased through surface modification treatment.

Note that a "t-plot" can be obtained by, in an adsorption isotherm of the fibrous carbon nanostructures measured by the nitrogen gas adsorption method, converting the relative pressure to an average thickness t (nm) of an adsorbed layer of nitrogen gas. Specifically, an average adsorbed nitrogen gas layer thickness t corresponding to a given relative pressure is determined from a known standard isotherm of average adsorbed nitrogen gas layer thickness t plotted against relative pressure P/P0 to perform this conversion and obtain a t-plot for the fibrous carbon nanostructures (t-plot method of de Boer et al.).

Note that the "t-plot" referred to in the present specification can be determined using a method described in the EXAMPLES section of the present specification.

In a substance having pores at its surface, the growth of the adsorbed layer of nitrogen gas is categorized into the following processes (1) to (3). The gradient of the t-plot changes in accordance with processes (1) to (3).

(1) A process in which a single molecule adsorption layer of nitrogen molecules is formed over the entire surface (2) A process in which a multi-molecule adsorption layer is formed and is accompanied by capillary condensation filling of pores (3) A process in which a multi-molecule adsorption layer is formed at a surface that appears to be non-porous due to the pores being filled by nitrogen In a t-plot having a convex upward shape, the plot is on a straight line passing through the origin in a region in which the average adsorbed nitrogen gas layer thickness t is small, but, as t increases, the plot deviates downward from the straight line. When fibrous carbon nanostructures have a t-plot shape such as described above, this indicates that the fibrous carbon nanostructures have a large ratio of internal specific surface area relative to total specific surface area and that many openings are present in carbon nanostructures constituting the fibrous carbon nanostructures.

A bending point of the t-plot for the fibrous carbon nanostructures is preferably within a range satisfying 0.2≤t (nm)≤1.5, more preferably within a range of 0.45≤t (nm) ≤1.5, and even more preferably within a range of 0.55≤t (nm)≤1.0. When the bending point of the t-plot for the fibrous carbon nanostructures is within any of the ranges set forth above, the fibrous carbon nanostructures can display particularly good characteristics when dispersibility thereof is increased through surface modification treatment.

The "position of the bending point" is defined as an intersection point of a linear approximation A for the above-described process (1) and a linear approximation B for the above-described process (3).

A ratio (S2/S1) of internal specific surface area S2 relative to total specific surface area S1 obtained from the t-plot for the fibrous carbon nanostructures is preferably not less than 0.05 and not more than 0.30. When the value of S2/S1 of the fibrous carbon nanostructures is within the range set forth above, the fibrous carbon nanostructures can display particularly good characteristics when dispersibility thereof is increased through surface modification treatment.

The total specific surface area S1 and the internal specific surface area S2 of the fibrous carbon nanostructures can be determined from the t-plot for the fibrous carbon nanostructures. Specifically, the total specific surface area S1 and external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Measurement of an adsorption isotherm of the fibrous carbon nanostructures, preparation of a t-plot, and calculation of the total specific surface area S1 and the internal specific surface area S2 based on t-plot analysis can be performed using a BELSORP®-mini (BELSORP is a registered trademark in Japan, other countries, or both), for example, which is a commercially available measurement apparatus produced by Bel Japan Inc.

Moreover, the fibrous carbon nanostructures including CNTs that are suitable as the fibrous carbon nanostructures preferably have a radial breathing mode (RBM) peak when evaluated by Raman spectroscopy. Note that an RBM is not present in the Raman spectrum of fibrous carbon nanostructures composed of only multi-walled carbon nanotubes having three or more walls.

The fibrous carbon nanostructures including CNTs preferably have a ratio (G/D ratio) of G band peak intensity relative to D band peak intensity in a Raman spectrum of not less than 0.5 and not more than 5.0. When the G/D ratio is not less than 0.5 and not more than 5.0, the fibrous carbon nanostructures can display particularly good characteristics when dispersibility thereof is increased by surface modification treatment.

The "G/D ratio" referred to in the present specification can be determined by the following method.

G/D Ratio

A microscopic laser Raman system (Nicolet Almega XR produced by Thermo Fisher Scientific) is used to measure fibrous carbon nanostructures in proximity to the center of a substrate.

The carbon purity of the fibrous carbon nanostructures is preferably 98 mass % or more, more preferably 99 mass % or more, and even more preferably 99.9 mass % or more.

The "carbon purity" referred to in the present specification can be determined by the following method.

Carbon Purity

Fibrous carbon nanostructures are heated to 800° C. in air using a thermogravimetric (TG) analyzer, and the carbon purity is calculated from the weight loss in this heating (carbon purity=(weight loss through combustion up until 800° C. is reached/initial weight)×100(%)).

Pre-Treatment

Although (i) pre-treatment including a step of heating fibrous carbon nanostructures to a temperature of 120° C. or higher, and preferably 190° C. or higher (normally 300° C. or lower) in a vacuum atmosphere or (ii) pre-treatment including a step of heating fibrous carbon nanostructures to a temperature of 800° C. or higher, and preferably 900° C. or higher (normally 1100° C. or lower) in an inert gas atmosphere may be performed, pre-treatment including a step of heating in a vacuum is preferable.

A treatment temperature that is not lower than any of the lower limits set forth above makes the fibrous carbon nanostructures easier to surface modify when subjected to surface modification treatment such as oxidation treatment, whereas a treatment temperature that is not higher than the upper limit set forth above can inhibit burning off of the fibrous carbon nanostructures.

Examples of suitable inert gases include nitrogen, argon, helium, and the like.

Note that (ii) the step of heating fibrous carbon nanostructures to 800° C. or higher in an inert gas atmosphere described above may be performed after (i) the step of heating fibrous carbon nanostructures to 120° C. or higher in a vacuum atmosphere described above, or (i) the step of heating fibrous carbon nanostructures to 120° C. or higher in a vacuum atmosphere described above may be performed after (ii) the step of heating fibrous carbon nanostructures to 800° C. or higher in an inert gas atmosphere described above.

The treatment time of the pre-treatment is preferably 10 minutes or more, more preferably 1 hour or more, and even more preferably 3 hours or more, and is preferably 36 hours or less, more preferably 30 hours or less, and even more preferably 24 hours or less.

A treatment time that is not less than any of the lower limits set forth above enables removal of impurities that promote air oxidation, whereas a treatment time that is not more than any of the upper limits set forth above can inhibit burning off of the fibrous carbon nanostructures.

Method of Producing Surface-Modified Fibrous Carbon Nanostructure

In the presently disclosed method of producing a surface-modified fibrous carbon nanostructure, one or more fibrous carbon nanostructures having specific properties such as set forth above are subjected to surface modification treatment to obtain surface-modified fibrous carbon nanostructures.

Surface Modification Treatment

The surface modification treatment can be carried out without any specific limitations using a surface modifying agent such as nitric acid, sulfuric acid, a mixed acid of nitric acid and sulfuric acid, ozone, fluorine gas, or hydrogen peroxide, for example. Of these examples, the surface modification treatment is preferably wet oxidation treatment performed using nitric acid, sulfuric acid, or a mixed acid of nitric acid and sulfuric acid from a viewpoint of obtaining surface-modified fibrous carbon nanostructures having excellent dispersibility, and is more preferably wet oxidation treatment performed using a mixed acid of nitric acid and sulfuric acid. The surface modification treatment conditions can be set in accordance with the type of surface modifying agent that is used and the desired properties of the surface-modified fibrous carbon nanostructures.

Surface-Modified Fibrous Carbon Nanostructures

Surface-modified fibrous carbon nanostructures obtained through surface modification treatment of the presently disclosed fibrous carbon nanostructures can, without any specific limitations, be well dispersed in a dispersion medium such as water without using a dispersant, for example. Moreover, the resultant fibrous carbon nanostructure dispersion liquid can be used in production of various shaped products (for example, antistatic films, transparent conductive films, etc.).

EXAMPLES

The following provides a more specific description of the present disclosure based on examples. However, the present disclosure is not limited to the following examples. In the following description, "%" used to express quantities is by mass, unless otherwise specified.

In the examples and comparative examples, the following methods were used to measure or evaluate: (I) (i) the full width at half maximum (° C.), (ii) the high-temperature-side temperature (b value) (° C.) at a height equivalent to 1/10 of peak top height, (iii) the weight loss (weight %) at a low-temperature-side temperature at a height equivalent to 7.5/10 of peak top height, and (iv) the peak top temperature (° C.) for a peak of a temperature derivative curve for fibrous carbon nanostructures including CNTs; and (II) surface modification treatability of the fibrous carbon nanostructures including CNTs.

Temperature Derivative Curve

Using a simultaneous thermogravimetric/differential thermal analyzer (produced by Bruker AXS; product name: TG-DTA2020SA), 2.00 mg of a measurement sample was placed in a Pt pan (100 μL) of the simultaneous thermogravimetric/differential thermal analyzer, a thermogravimetric curve for fibrous carbon nanostructures was measured under conditions of a heating rate of 5° C./min and a dry air flow rate of 200 mL/min (data acquisition frequency: 0.5 s/point), and a temperature derivative curve that was a first derivative curve was obtained (first derivative curve preparation conditions: differentiation width of 10 points).

The thermogravimetric curve had mass on a vertical axis and temperature on a horizontal axis, and the temperature derivative curve had a derivative thermogravimetric (DTG) value on a vertical axis and temperature on a horizontal axis as illustrated in FIG. 1, for example.

In FIG. 1, a peak indicated by a solid line is for fibrous carbon nanostructures before pre-treatment (for example, Comparative Examples 1 to 4) and a peak indicated by a dashed line is for fibrous carbon nanostructures after pre-treatment (for example, Examples 1 to 4).

The peak of the temperature derivative curve was used to determine (i) the full width at half maximum (° C.), (ii) the high-temperature-side temperature (b value) (° C.) at a height equivalent to 1/10 of peak top height, (iii) the weight loss (weight %) at a low-temperature-side temperature at a height equivalent to 7.5/10 of peak top height, and (iv) the peak top temperature (° C.).

(i) Full width at half maximum (° C.): $T_b - T_a$ (ii) High-temperature-side temperature (° C.) ("b Value" in Table 1) at height (h/10) equivalent to 1/10 of peak top height h: $T_c$ (iii) Weight loss (weight %) ("Weight loss" in Table 1) at low-temperature-side temperature $T_d$ at height (7.5 h/10) equivalent to 7.5/10 of peak top height h: A (iv) Peak top temperature (° C.): $T_{max}$ $T_{max}$: Peak top temperature (° C.)

$DTG_{max}$: Derivative thermogravimetric value (%/° C.) (peak top height h) at temperature $T_{max}$ $T_{ini}$: Temperature (° C.) at start point of peak $T_a$: Temperature (° C.) at which derivative thermogravimetric value is equivalent to 1/2 of $DTG_{max}$ (i.e., h/2) (low-temperature-side)

$T_b$: Temperature (° C.) at which derivative thermogravimetric value is equivalent to 1/2 of $DTG_{max}$ (i.e., h/2) (high-temperature-side; $T_b > T_a$)

$T_c$: Temperature (° C.) at which derivative thermogravimetric value is equivalent to 1/10 of $DTG_{max}$ (i.e., h/10) (high-temperature-side)

$T_d$: Temperature (° C.) at which derivative thermogravimetric value is equivalent to 7.5/10 of $DTG_{max}$ (i.e., 7.5 h/10) (low-temperature-side)

A: Peak area (peak integral) of temperature region from $T_{ini}$ to $T_d$

Surface Modification Treatability

A 300 mL flask including a condenser and an impeller was charged with 0.80 g of obtained fibrous carbon nanostructures (Examples 1 to 4: fibrous carbon nanostructures after pre-treatment; Comparative Examples 1 to 4: fibrous carbon nanostructures that had not been pre-treated), 54.8 g of deionized water, and 83 mL of a mixed acid containing sulfuric acid (produced by Wako Pure Chemical Industries, Ltd.; concentration: 96% to 98%) and nitric acid (produced by Wako Pure Chemical Industries, Ltd.; concentration: 69% to 70%) in a ratio of 1:3 (volume ratio). The flask was then heated under stirring at an internal temperature of 110° C. for 8 hours.

Thereafter, 3.0 g of a liquid of fibrous carbon nanostructures and mixed acid obtained after mixed acid treatment (also referred to as the "present treatment" or "wet oxidation treatment") was measured into a 50 mL sample bottle and was diluted through addition of 27.0 g of deionized water. Supernatant was removed and then the liquid volume was adjusted to 30 mL through addition of deionized water. The pH was adjusted to 7.0 through addition of ammonia water of 0.1% in concentration, and then an ultrasonic irradiation apparatus (produced by Branson Ultrasonics Corporation; product name: BRANSON 5510) was used to perform ultrasonic irradiation for 50 minutes at a frequency of 42 Hz to obtain a dispersion liquid of fibrous carbon nanostructures.

Evaluation of Dispersion Liquid

The obtained dispersion liquid was subjected to three cycles of centrifugal separation for 40 minutes at 20,000 G and collection of supernatant using a centrifuge (produced by Beckman Coulter Inc.; product name: OPTIMA XL100K) to obtain 20 mL of a dispersion liquid of fibrous carbon nanostructures that had undergone centrifugal separation. The obtained dispersion liquid was visually checked for the presence of aggregates.

In addition, a spectrophotometer (produced by JASCO Corporation; product name: V670) was used to measure light absorbance Ab1 (optical path length: 1 cm; wavelength: 550 nm) of the dispersion liquid prior to treatment in the centrifuge and light absorbance Ab2 (optical path length: 1 cm; wavelength: 550 nm) of the dispersion liquid after treatment in the centrifuge. Dispersibility of the fibrous carbon nanostructures was evaluated by calculating reduction of light absorbance due to centrifugal separation by the following formula. Less reduction of light absorbance (50% or less) indicates that the fibrous carbon nanostructures have been well surface modified and that dispersibility of the fibrous carbon nanostructures is excellent.

Reduction of light absorbance (%)={1−($Ab2/Ab1$)}×100

Evaluation of Shaped Product (Film)

The obtained dispersion liquid was applied onto a glass base plate by a #2 bar coater and was then dried at 130° C. for 10 minutes to form a film composed of fibrous carbon nanostructures on the glass base plate.

Dispersibility of the fibrous carbon nanostructures was evaluated by observing the obtained film using an optical microscope (×100 magnification) and checking whether visible clumps (30 μm or more in diameter) of fibrous carbon nanostructures were present in the field of view of the microscope. A smaller number of clumps of fibrous carbon nanostructures indicates that the fibrous carbon nanostructures have been well surface modified and that dispersibility of the fibrous carbon nanostructures is excellent.

Overall Evaluation

An evaluation of "Excellent" was given in cases in which reduction of light absorbance was 50% or less, aggregates were not present in the dispersion liquid, and clumps were not present in the film, and an evaluation of "Poor" was given in cases other than "Excellent".

Example 1

Single-walled carbon nanotubes "ZEONANO SG101" produced by Zeon Nanotechnology Co., Ltd. were used as an aggregate of fibrous carbon nanostructures (fibrous carbon nanostructures including CNTs). The fibrous carbon nanostructures including CNTs were subjected to pre-treatment by heating to 190° C. for 15 hours in a vacuum using an oven including an oil rotary vacuum pump.

Evaluations of: (I) (i) the full width at half maximum (° C.), (ii) the high-temperature-side temperature (b value) (° C.) at a height equivalent to $\frac{1}{10}$ of peak top height, (iii) the weight loss (weight %) at a low-temperature-side temperature at a height equivalent to 7.5/10 of peak top height, and (iv) the peak top temperature (° C.) for a peak of a temperature derivative curve; and (II) surface modification treatability were performed for the obtained fibrous carbon nanostructures. The results are shown in Table 1.

Example 2

An aggregate of fibrous carbon nanostructures (fibrous carbon nanostructures including CNTs) was obtained in the same way as in Example 1 with the exception that instead of performing pre-treatment through heating to 190° C. for 15 hours in a vacuum in Example 1, pre-treatment was performed through heating to 120° C. for 15 hours in a vacuum.

Evaluations of: (I) (i) the full width at half maximum (° C.), (ii) the high-temperature-side temperature (b value) (° C.) at a height equivalent to $\frac{1}{10}$ of peak top height, (iii) the weight loss (weight %) at a low-temperature-side temperature at a height equivalent to 7.5/10 of peak top height, and (iv) the peak top temperature (° C.) for a peak of a temperature derivative curve; and (II) surface modification treatability were performed for the obtained fibrous carbon nanostructures. The results are shown in Table 1.

Example 3

An aggregate of fibrous carbon nanostructures (fibrous carbon nanostructures including CNTs) was obtained in the same way as in Example 1 with the exception that instead of performing pre-treatment through heating to 190° C. for 15 hours in a vacuum in Example 1, pre-treatment was performed through heating to 900° C. for 6 hours in a nitrogen atmosphere.

Evaluations of: (I) (i) the full width at half maximum (° C.), (ii) the high-temperature-side temperature (b value) (° C.) at a height equivalent to $\frac{1}{10}$ of peak top height, (iii) the weight loss (weight %) at a low-temperature-side temperature at a height equivalent to 7.5/10 of peak top height, and (iv) the peak top temperature (° C.) for a peak of a temperature derivative curve; and (II) surface modification treatability were performed for the obtained fibrous carbon nanostructures. The results are shown in Table 1.

Example 4

An aggregate of fibrous carbon nanostructures (fibrous carbon nanostructures including CNTs) was obtained in the same way as in Example 1 with the exception that instead of performing pre-treatment through heating to 190° C. for 15 hours in a vacuum in Example 1, pre-treatment was performed through heating to 800° C. for 6 hours in a nitrogen atmosphere.

Evaluations of: (I) (i) the full width at half maximum (° C.), (ii) the high-temperature-side temperature (b value) (° C.) at a height equivalent to 1/10 of peak top height, (iii) the weight loss (weight %) at a low-temperature-side temperature at a height equivalent to 7.5/10 of peak top height, and (iv) the peak top temperature (° C.) for a peak of a temperature derivative curve; and (II) surface modification treatability were performed for the obtained fibrous carbon nanostructures. The results are shown in Table 1.

Comparative Example 1

Evaluations of: (I) (i) the full width at half maximum (° C.), (ii) the high-temperature-side temperature (b value) (° C.) at a height equivalent to 1/10 of peak top height, (iii) the weight loss (weight %) at a low-temperature-side temperature at a height equivalent to 7.5/10 of peak top height, and (iv) the peak top temperature (° C.) for a peak of a temperature derivative curve; and (II) surface modification treatability were performed for single-walled carbon nanotubes "ZEONANO SG101" produced by Zeon Nanotechnology Co., Ltd. as an aggregate of fibrous carbon nanostructures (fibrous carbon nanostructures including CNTs) that had not been subjected to pre-treatment by heating in a vacuum. The results are shown in Table 1.

Comparative Example 2

Evaluations of: (I) (i) the full width at half maximum (° C.), (ii) the high-temperature-side temperature (b value) (° C.) at a height equivalent to 1/10 of peak top height, (iii) the weight loss (weight %) at a low-temperature-side temperature at a height equivalent to 7.5/10 of peak top height, and (iv) the peak top temperature (° C.) for a peak of a temperature derivative curve; and (II) surface modification treatability were performed for an aggregate of fibrous carbon nanostructures (fibrous carbon nanostructures including CNTs) in the same way as in Comparative Example 1 with the exception that single-walled carbon nanotubes "TUBALL" produced by OCSiAl were used as the aggregate of fibrous carbon nanostructures in Comparative Example 1. The results are shown in Table 1.

Comparative Example 3

Evaluations of: (I) (i) the full width at half maximum (° C.), (ii) the high-temperature-side temperature (b value) (° C.) at a height equivalent to 1/10 of peak top height, (iii) the weight loss (weight %) at a low-temperature-side temperature at a height equivalent to 7.5/10 of peak top height, and (iv) the peak top temperature (° C.) for a peak of a temperature derivative curve; and (II) surface modification treatability were performed for an aggregate of fibrous carbon nanostructures (fibrous carbon nanostructures including CNTs) in the same way as in Comparative Example 1 with the exception that single-walled carbon nanotubes "Signis SG-65i" were used as the aggregate of fibrous carbon nanostructures in Comparative Example 1. The results are shown in Table 1.

Comparative Example 4

Evaluations of: (I) (i) the full width at half maximum (° C.), (ii) the high-temperature-side temperature (b value) (° C.) at a height equivalent to 1/10 of peak top height, (iii) the weight loss (weight %) at a low-temperature-side temperature at a height equivalent to 7.5/10 of peak top height, and (iv) the peak top temperature (° C.) for a peak of a temperature derivative curve; and (II) surface modification treatability were performed for an aggregate of fibrous carbon nanostructures (fibrous carbon nanostructures including CNTs) in the same way as in Comparative Example 1 with the exception that single-walled carbon nanotubes "MEIJO eDIPS EC1.5" produced by Meijo Nano Carbon were used as the aggregate of fibrous carbon nanostructures in Comparative Example 1. The results are shown in Table 1.

TABLE 1

| | | Fibrous carbon nanostructures | | | | Surface modification treatability | | | |
| | | | | | | Dispersion liquid | | Film | |
| | Pre-treatment | Full width at half maximum ° C. | b Value ° C. | Weight loss Weight % | Peak top temperature ° C. | Reduction of light absorbance % | Aggregates in dispersion liquid | Clumps in film | Overall evaluation |
|---|---|---|---|---|---|---|---|---|---|
| Example 1 | 190° C. vacuum | 49 | 689 | 29 | 633 | 22 | No | No | Excellent |
| Example 2 | 120° C. vacuum | 42 | 673 | 31 | 632 | 27 | No | No | Excellent |
| Example 3 | 900° C. nitrogen | 39 | 659 | 35 | 628 | 40 | No | No | Excellent |
| Example 4 | 800° C. nitrogen | 39 | 660 | 40 | 628 | 43 | No | No | Excellent |
| Comparative Example 1 | None | 36 | 656 | 41 | 633 | 61 | Yes | Yes | Poor |
| Comparative Example 2 | None | 138 | 721 | 24 | 599 | 65 | Yes | Yes | Poor |
| Comparative Example 3 | None | 49 | 512 | 35 | 453 | 56 | Yes | Yes | Poor |
| Comparative Example 4 | None | 141 | 988 | 44 | 790 | 98 | Yes | Yes | Poor |

It can be seen from Table 1 that the fibrous carbon nanostructures of Examples 1 to 4 were well surface modified and had excellent dispersibility (overall evaluation of "Excellent") compared to the fibrous carbon nanostructures of Comparative Examples 1 to 4.

INDUSTRIAL APPLICABILITY

According to the present disclosure, it is possible to provide a fibrous carbon nanostructure that is easy to surface modify and a method of producing this fibrous carbon nanostructure.

Moreover, according to the present disclosure, it is possible to provide a method of producing a surface-modified fibrous carbon nanostructure that has been well surface modified.

REFERENCE SIGNS LIST $T_{max}$: Peak top temperature (° C.)
$DTG_{max}$: Derivative thermogravimetric value (%/° C.) (peak top height h) at temperature $T_{max}$
$T_{ini}$: Temperature (° C.) at start point of peak
$T_a$: Temperature (° C.) at which derivative thermogravimetric value is equivalent to ½ of $DTG_{max}$ (i.e., h/2) (low-temperature-side)
$T_b$: Temperature (° C.) at which derivative thermogravimetric value is equivalent to ½ of $DTG_{max}$ (i.e., h/2) (high-temperature-side; $T_b > T_a$)
$T_c$: Temperature (° C.) at which derivative thermogravimetric value is equivalent to 1/10 of $DTG_{max}$ (i.e., h/10) (high-temperature-side)
$T_d$: Temperature (° C.) at which derivative thermogravimetric value is equivalent to 7.5/10 of $DTG_{max}$ (i.e., 7.5 h/10) (low-temperature-side)
A: Peak area (peak integral) of temperature region from $T_{ini}$ to $T_d$

The invention claimed is:

1. A fibrous carbon nanostructure for which a peak of a temperature derivative curve that is a first derivative curve of a thermogravimetric curve obtained by thermogravimetric analysis in a dry air atmosphere has a full width at half maximum of not less than 38° C. and less than 90° C., and
   a high-temperature-side temperature at a height equivalent to 1/10 of peak top height of the peak is 658° C. or higher.

2. The fibrous carbon nanostructure according to claim 1, having a weight loss of 40 weight % or less at a low-temperature-side temperature at a height equivalent to 7.5/10 of the peak top height of the peak.

3. The fibrous carbon nanostructure according to claim 1, wherein the peak has a peak top temperature of not lower than 530° C. and lower than 730° C.

4. A method of producing a fibrous carbon nanostructure that produces the fibrous carbon nanostructure according to claim 1, comprising heating a fibrous carbon nanostructure to a temperature of 120° C. or higher in a vacuum atmosphere.

5. A method of producing a fibrous carbon nanostructure that produces the fibrous carbon nanostructure according to claim 1, comprising heating a fibrous carbon nanostructure to a temperature of 800° C. or higher in an inert gas atmosphere.

6. A method of producing a surface-modified fibrous carbon nanostructure comprising performing surface modification treatment of the fibrous carbon nanostructure according to claim 1 to obtain a surface-modified fibrous carbon nanostructure.

7. The method of producing a surface-modified fibrous carbon nanostructure according to claim 6, wherein the surface modification treatment is wet oxidation treatment.

* * * * *